United States Patent [19]

Chaconas

[11] 4,433,589
[45] Feb. 28, 1984

[54] GEAR REDUCTION ARRANGEMENT FOR VARIABLE SPEED POWER DRIVEN TOOL

[75] Inventor: Peter C. Chaconas, Glyndon, Md.

[73] Assignee: Black & Decker Inc., Newark, Del.

[21] Appl. No.: 292,437

[22] Filed: Aug. 14, 1981

[51] Int. Cl.³ .................... F16H 35/06; F16H 1/12; F16H 55/17

[52] U.S. Cl. .................... 74/325; 74/396; 74/421 R; 74/438; 83/788

[58] Field of Search .............. 173/29; 74/392, 396, 74/397, 414, 421 R, 325, 352, 460, 438; 29/159.2; 83/788

[56] References Cited

U.S. PATENT DOCUMENTS

| | | | |
|---|---|---|---|
| 363,776 | 5/1887 | Sweet | 74/325 |
| 415,755 | 11/1889 | Whiteley | 74/460 |
| 1,297,462 | 3/1919 | Hallenbeck | 74/325 |
| 1,349,958 | 8/1920 | Head | 74/325 |
| 2,436,746 | 2/1948 | Drought | 74/397 |
| 2,625,964 | 1/1953 | Green et al. | 143/21 |
| 2,798,518 | 7/1957 | Gray | 143/157 |
| 3,390,598 | 7/1968 | Sands et al. | 83/201.15 |
| 3,961,550 | 6/1976 | Oliver | 83/574 |

*Primary Examiner*—Allan D. Herrmann
*Assistant Examiner*—Bruce Wojciechowski
*Attorney, Agent, or Firm*—Ronald B. Sherer; Harold Weinstein; Charles E. Yocum

[57] ABSTRACT

A power tool, is adapted to be driven by an external drive means such as a portable, hand held drill, through a novel gear reduction arrangement in which a selected pinion gear and an idler gear are supported between a gear case cover and the tool frame. The gear reduction arrangement provides for a gear case cover having a support position for a pinion and a plurality of support positions for the idler gear. The idler gear support positions are placed at varying distances from the pinion gear position to accommodate pinion gears of various sizes and numbers of teeth, thereby to permit the tool to be operated at a plurality of gear reduction ratios.

5 Claims, 12 Drawing Figures

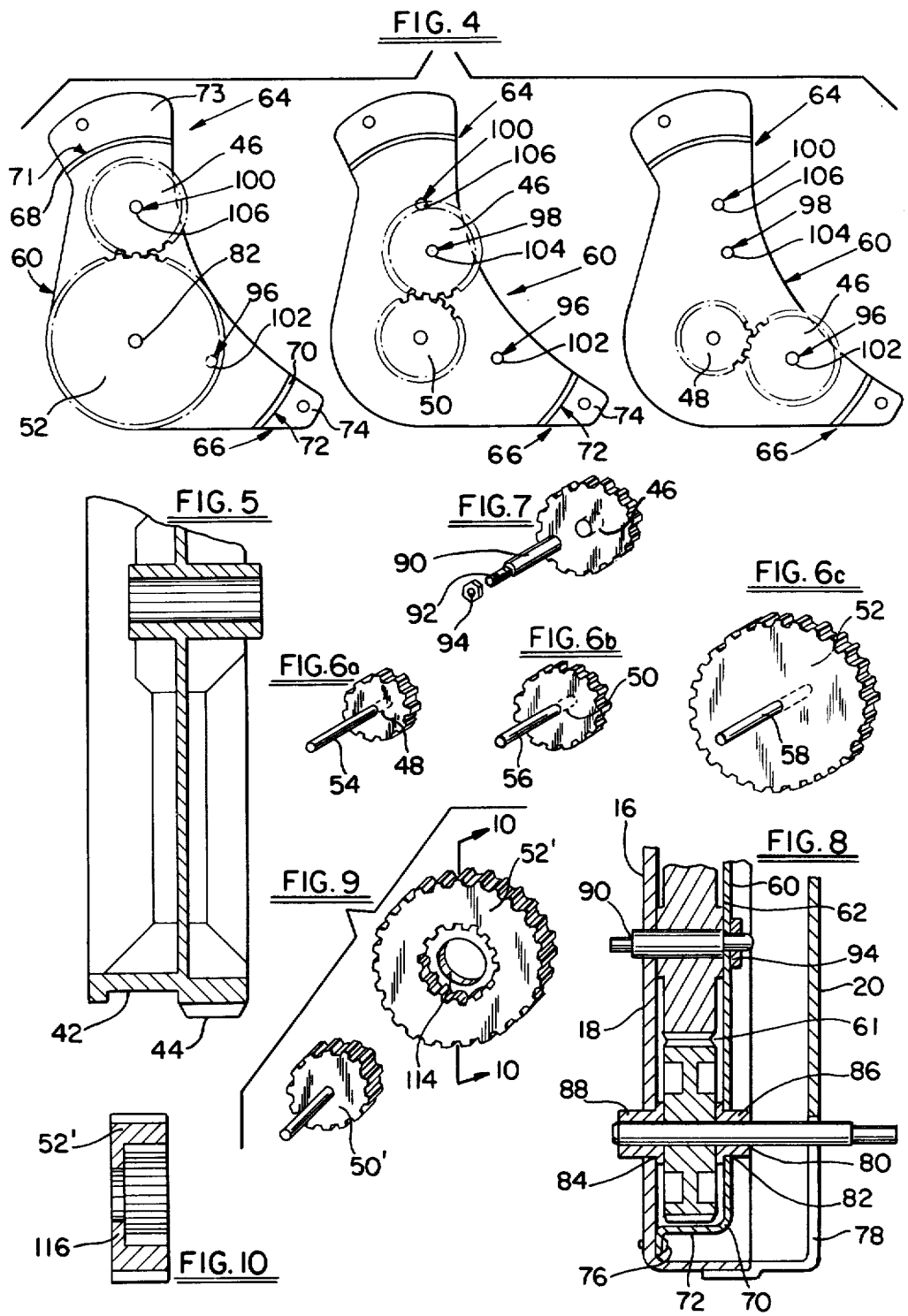

GEAR REDUCTION ARRANGEMENT FOR VARIABLE SPEED POWER DRIVEN TOOL

BACKGROUND OF THE INVENTION

1. Field of the Invention

The present invention pertains to power tools. More particularly, the present invention pertains to power tools which are driven by external drive means.

2. Prior Art

There are a variety of power tools known in the art which are adapted to be powered by external drive means. Commonly, the external drive means comprises a hand held power drill which is particularly suited to this application. The drill or motor may be "chucked" directly onto the pinion gear or input shaft in place of a bit and rotated thereby.

Generally, externalizing drive means is economical and efficient as a single motor is used to power a variety of tool accessories, rather than providing a separate motor for each tool which remains idle when that tool is not used. However, heretofore, the economics inherent in externally powered tools were accompanied by a loss of flexibility and convenience. For example, in known, externally powered tools that gear reduction ratio is fixed and must be used for all purposes. Accordingly, the output speeds of such externally driven tools are not easily adjustable. However, as different types of work require different tool speeds and power output ratios, fixed output ratio, externally driven tools often prove unsuitable for a number of applications.

Accordingly, substantial benefits would be achieved by providing a convenient means for adjusting the output speed of externally driven power tools in accordance with the nature of the work to be performed.

SUMMARY OF THE INVENTION

According to the present invention, a power tool is adapted to be driven by an external power source through selected gear reduction ratios. The power tool is provided with a gear reduction assembly comprising a driven gear, an idler gear and a number of pinion gears. The pinion gears are of different sizes to provide for predetermined numbers of gear teeth to achieve selected gear reduction ratios.

In the preferred embodiments, the idler and pinion gears are supported between the power tool frame and gear case cover which provide a plurality of idler gear support positions and one pinion gear support position. The idler gear support positions are deployed at varying distances from the pinion gear support position to accommodate the different sized gear pinions and so as to maintain operative engagement between the idler gear, the driven gear and a selected pinion gear. The gear case cover is easily detachable from the tool and the gears substituted and rearranged merely by inserting the selected pinion gear in its support position and the idler gear in the proper support position for the size of the pinion gear selected.

In a preferred embodiment, a variety of pinion gears having predetermined numbers of teeth are provided to achieve selected gear reduction ratios. Each pinion gear is rigidly mounted to a pinion shaft which is adapted to be connected to an external drive means and which is rotatably supported in bearings provided in the tool frame and gear case cover.

In a second embodiment, the pinion gears comprise a first, small gearhead, rigidly mounted on a pinion shaft, adapted to be chucked into the external power source, and a plurality of larger gearhead attachments each having a toothed central bore configured to receive the mounted small gearhead matingly therein, thereby to mount the larger gear to the pinion shaft.

Therefore, it is an object of the present invention to provide means for adapting externally driven power tools to be driven by external drive means having varying torque and speed outputs.

It is a further object of the present invention to provide an externally driven power tool with a gear reduction assembly which may be easily adapted to produce a variety of output speeds.

It is still a further object of the present invention to provide an externally driven power tool with a simple gear reduction assembly which may be manufactured economically and which may be disassembled easily by the operator to substitute and rearrange gears to produce a desired output speed.

Other objects and advantages of the present invention will become obvious when the following specification is read in conjunction with the drawings in which:

DESCRIPTION OF THE DRAWINGS

FIGS. 4a, 4b, and 4c are elevational views of the gear reduction arrangement hereof showing alternate gear arrangements;

FIG. 5 is a sectional view taken along lines 5—5 in FIG. 3;

FIGS. 6a, 6b and 6c are perspective views of pinion gears of a preferred embodiment hereof;

FIG. 7 is a perspective view of an idler gear;

FIG. 8 is a sectional view taken along lines 8—8 of FIG. 1;

FIG. 9 is a perspective view of a pinion gear and pinion gear attachment of a second embodiment hereof; and FIG. 10 is a sectional view taken along lines 10—10 in FIG. 9.

DESCRIPTION OF THE PREFERRED EMBODIMENTS

Figure 1:
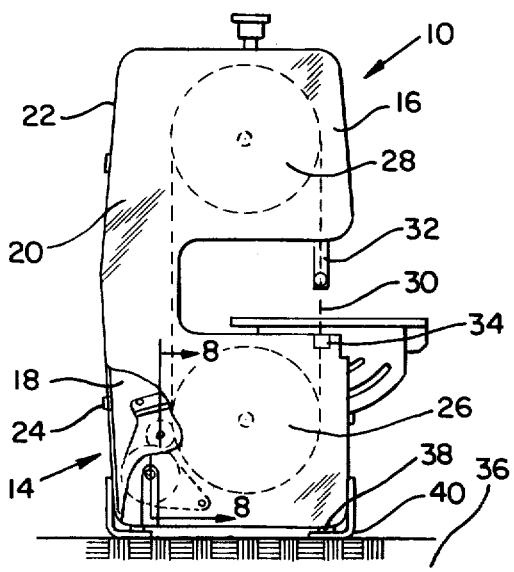
FIG. 1 is an elevational side view of a bandsaw in which the present invention has particular utility, partially broken away to show the gear reduction arrangement hereof.
Figure 2:
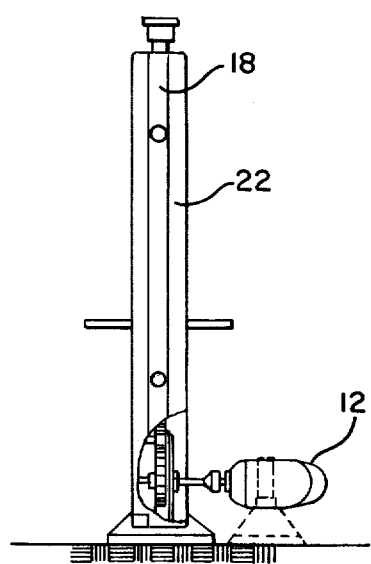
FIG. 2 is a rear view of the bandsaw of FIG. 1.
Figure 3:
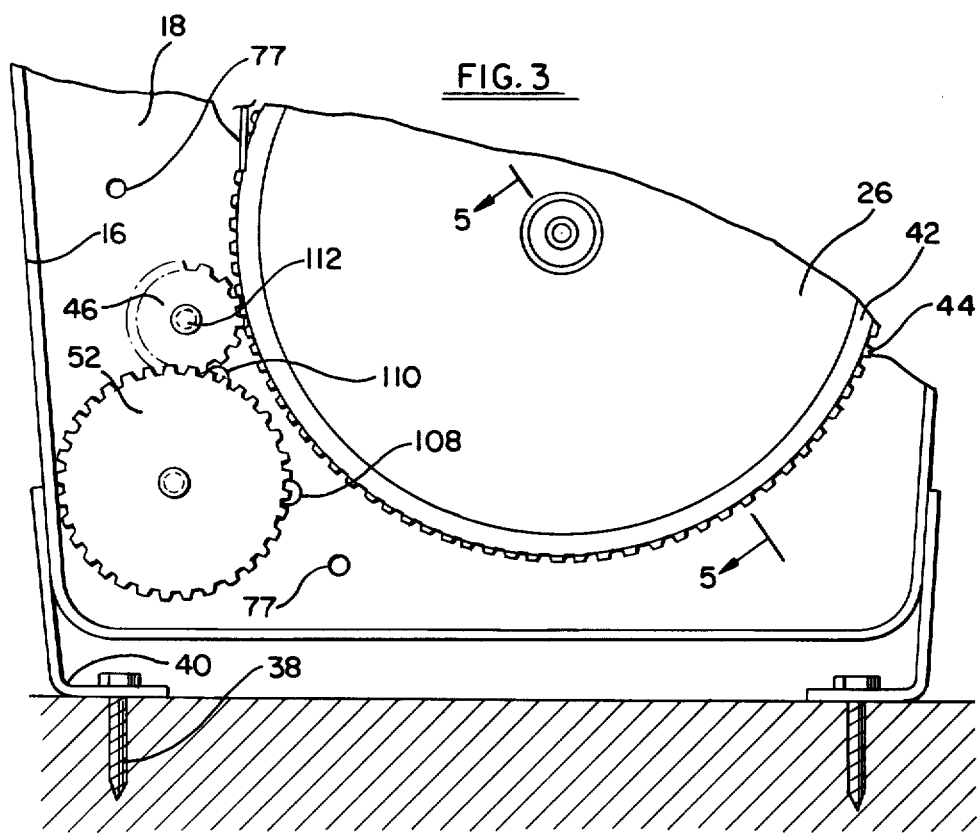
FIG. 3 is an enlarged view of the lower portion of the bandsaw of FIG. 1.

Now and with reference to FIGS. 1 and 2, there is depicted a band saw, indicated generally at 10 which is adapted to be driven by a hand drill 12, and which is provided with the novel gear reduction arrangement hereof, shown generally at 14. It is to be understood, however, that the band saw is shown only for purposes of illustration and should not be deemed limitative hereof, as the present gear reduction arrangement may be adapted to a variety of power tool applications.

The bandsaw 10 shown comprises a frame 16 having a main body portion 18 and a detachably mounted cover 20. The cover 20 extends over the main body portion of the frame and has an upstanding peripheral wall 22 which overlaps the main body portion. The cover is detachably secured to the main body of the frame by fastening means such as screws 24 which are received through aligned apertures in the cover wall and the frame. The band saw further comprises a drive pulley 26, an idler pulley 28 and a band blade 30 which is carried around the pulleys 26, 28 and supported by upper and lower blade guides 32, 34. The band saw may be secured to a work surface 36 by means of bolts 38 or other fastening devices, received through feet 40 provided on the frame 16.

The drive pulley 26 is positioned in the lower portion of the frame 16 and comprises a band carrying portion 42 and a toothed, driven gear portion 44. The band carrying portion 42 is covered with a band of high friction material, such as rubber, to provide proper frictional engagement with the blade 30.

The drive pulley 26 is driven by the hand drill 12 through the novel gear reduction arrangement 14 hereof which is positioned in the lower portion of the frame 16 proximate the drive pulley 26. The gear reduction arrangement 14 comprises a toothed, idler gear 46 which meshes with the toothed, gear portion 44 of the drive pulley 26 and with one of a plurality of pinion gears 48, 50, 52, through which the idler gear and the gear portion 44 of the pulley 26 are driven.

In a preferred embodiment, as shown in detail in FIGS. 6a, 6b and 6c, each pinion gear is mounted on a pinion shaft 54, 56, 58, respectively. The pinion and idler gears are supported in the frame 16 between the main body portion 18 of the frame and a gear case cover 60. The gear case cover 60 is detachably mounted to the main body portion 18 of the frame 16 and forms a support portion 62 therewith.

As shown in FIG. 4, the gear case cover preferably comprises a stamped sheet metal member having the support portion 62 and integrally formed mounting portions 64, 66. The mounting portions 64, 66 comprise first, convex portions 68, 70, depending wall portions 71, 72 and foot portions 73,74 which cooperate to space the support portion 62 from the frame a suitable distance for receiving idler and pinion gears therebetween. The gear case cover is detachably mounted to the main body portion 18 of the frame 16 by fastening means such as screws 76 which are received through aligned apertures in the foot portions 64, 66 and the frame 16.

As best seen in FIG. 8, each pinion gear shaft 54, 56 or 58 is adapted to extend through a slot 78 in the frame cover 20, and to be received in a pinion mounting position 80. The pinion mounting position 80 comprises a pinion mounting aperture 82 in the gear case cover 60 and an aligned pinion mounting aperture 84 in the main body portion 18 of the frame 16. The slot 78 in the cover permits removal of the cover for such purposes as band replacement without disengagement of the drill. The pinion mounting apertures 82 and 84 in the gear case cover 60 and the frame 16 are each provided with bearings, 86, 88, respectively for providing proper rotational support for the shafts.

The idler gear 46 is supported between the gear case cover 60 and the main body portion 18 of the frame 16. More particularly, the idler gear 46 is rotatably mounted on a relatively short shaft 90 which is adapted to extend through mounting apertures in the gear case cover 60 and the frame 18 and is provided with threading 92 at its free end by which means the shaft may be secured in position on the gear case cover 60 by fastening means such as nut 94.

The pinion gears 48, 50, 52 provided have predetermined numbers of teeth to achieve operation at selected gear reduction ratios. In the embodiments shown, the idler gear has 19 teeth, and the pinion gears, 48, 50 and 52 has 11, 15 and 33 teeth respectively. The pinion gears 48, 50 and 52 each have substantially different diameters to accommodate their different numbers of teeth. Accordingly, a plurality of idler gear mounting positions 96, 98 and 100 are provided in the gear case cover 60. Each idler gear mounting position 96, 98, 100 comprises an aperture 102, 104, 106 in the gear case cover 60 and an aligned aperture 108, 110, 112 in the main body portion 18 of the frame 16. Each idler gear mounting position corresponds to a pinion gear 48, 50, 52 and is located at a point determined by the diameter of that pinion gear, such that an idler gear supported in a mounting position will be disposed for proper driving interconnection between the corresponding pinion gear and the gear portion 44 of the driven pulley 26.

When pinion gear 48 is positioned in pinion mounting position 80, the idler gear 46 is mounted in idler gear mounting position 96; in mounting position 96, the idler gear will be in proper position for meshing with pinion gear 48 and the toothed gear portion 44 of the drive pulley 26. If pinion gear 50 is inserted into pinion gear mounting position 80, the idler gear 46 is moved to idler gear mounting position 98 in which it is in proper position for meshing with pinion gear 50 and the toothed, gear portion 44 of the drive pulley 26. Similarly, when pinion gear 52 is positioned in the pinion gear mounting position 80, the idler gear 46 is mounted in idler gear mounting position 100, in proper position for meshing with pinion gear 40 and the toothed, gear portion 44 of the drive pulley.

In this manner, a plurality of drive to driven gear ratios can be achieved by selection of a pinion gear having an appropriate number of teeth and positioning the idler gear in its corresponding mounting position for meshing with the toothed, gear portion 44 of the drive pulley 26 and with the pinion gear selected.

In the embodiments shown, the pinion gear shafts for the 15 tooth gear is adapted to be chucked into a ⅜ inch or ¼ inch drill. The 33 tooth and 11 tooth gears are adapted to be chucked only into a 154 inch drill for reasons which will be explained more fully hereinbelow.

When the bandsaw 10 is driven by a ¼ inch drill through the 15 tooth pinion gear, the blade will run at a rate of about 650 fpm (feet per minute). This blade speed is well suited to wood cutting and other similar applications and is also appropriate to the chuck output speed and gear reduction ratios of ¼ inch drills.

When the bandsaw 10 is driven by a ⅜ inch drill, the chuck output speed and gear reduction ratio of ⅜ inch drills permit the bandsaw to be adapted to heavier duty work, as well as to wood cutting and the like. For example, to provide for ferrous metal cutting, a particularly high torque and low band speed may be achieved using the 11 tooth pinion gear 48. The 11 tooth pinion gear will produce a blade speed of about 195 fpm. Replacement of the 11 tooth with the 15 tooth pinion gear will yield a blade speed of about 325 fpm which is suitable for relatively heavy duty purposes, such as cutting nonferrous metals. A relatively high blade speed of approximately 650 fpm for lighter work such as wood cutting can also be achieved using the 33 tooth pinion gear.

Accordingly, it is to be appreciated that the present gear reduction arrangement enables operation of a tool attachment such as the band saw thereof, through a variety of gear reduction ratios to produce a variety of useful output speeds when an suitable external drive means, such as a ⅜ inch drill is applied.

Moreover, it is to be appreciated that the present gear reduction mechanism enables operation of tool attachments such as a the bandsaw hereof through a variety of external drive means, such as ¼ inch and ⅜ inch drills, by compensating for the output torques and speed of such devices by varying the gear ratio inputs of the tool attachment drive means, such as a drill, through a variety of gear ratios. Thus, the present gear arrangement permits flexibility in the choice of external drive means, permitting operation by devices having relatively higher and lower output torques and speeds. Still greater advantages and economies can be achieved in a second embodiment of the invention, shown in FIGS. 9 and 10. This second embodiment increases the flexibility of the arrangement by providing a particularly useful and convenient pinion gear arrangement.

The 15 tooth pinion gear 50' of the second embodiment, as shown in FIG. 9 is similar in all respects to pinion gear 50 of the first embodiment. Pinion gear 52' is a 33 tooth gear, comparable to pinion gear 52 of the first embodiment. However, gear 52' is an attachment gear head and as such does not have an associated pinion shaft, but rather is provided with a toothed, central through bore 114, configured to receive gear 50' matingly therein. More particularly, the central through bore 114 of pinion gear 52' has a diameter equal to the diameter of pinion gear 50', and is provided with teeth complementary to those of pinion gear 50' such that pinion gear 52' will fit matingly over pinion gear 50' to provide a driving interconnection therebetween.

The pinion gear 52' is further provided with a flange 116 which is positioned and configured to extend between the inner gear 50' and the gear case cover 60 to retain gear 52' in position.

The pinion gear arrangement of the second embodiment enhances the convenience and adaptability of the subject gear reduction arrangement. Pinion gear attachments may be provided in various sizes, in accordance with the capacities and requirements of the driven tool accessory and the driving means. The pinion gear attachments hereof may be acquired as needed and may be stacked easily and conveniently for storage.

Alternatively, if desired, lugs may be provided on the pinion gear shaft and mating lug receiving recesses in the pinion gear attachment heads to achieve convenient substitution of pinion gears.

Many adaptations in the present invention will become apparent to the skilled artisan, for example, the idler or pinion gear shaft may be cantilevered within or from a support point outside the frame or the gear reduction arrangements hereof may be adapted to permit an externally driven device to be driven by a variety of driving tools, thereby enhancing greatly the usefulness, flexibility and economy of such tool accessories, all falling within the scope and spirit of the present invention and the appended claims.

What is claimed is:

1. A gear reduction arrangement for a power driven tool, comprising:
   (a) a frame having a main body portion and a frame cover detachably mounted to the main body portion;
   (b) a gear case cover detachably mounted to the main body portion intermediate the main body portion and the frame cover;
   (c) a driven gear of a first predetermined diameter rotatably positioned with respect to the frame;
   (d) pinion gear means rotatably positioned with respect to the frame and comprising one of a plurality of pinion gears and a pinion gear shaft, said pinion gears having different diameters;
   (e) an idler gear of a second predetermined diameter and having an idler gear mounting shaft;
   (f) means for supporting the idler gear and the pinion gear means between the frame main body portion and the gear case cover so that the idler gear is placed in meshing interengagement with the driven gear and the pinion gear means, without requiring changing the predetermined diameters of either the driven gear or the idler gear and without requiring changing the position of either the driven gear or the pinion gear means with respect to the frame, over a range of diameters of said plurality of pinion gears; and
   (g) the means for supporting the idler gear and the pinion gear means including aligned pinion gear mounting apertures in the gear case cover and the frame main body portion for receiving the pinion gear shaft, and further including a plurality of discrete aligned idler gear mounting apertures in the gear case cover and the frame main body portion for receiving the idler gear mounting shaft, each one of the plurality of aligned idler gear mounting apertures corresponding to said one of the plurality of the pinion gears.

2. The gear reduction arrangement claimed in claim 1, wherein the gear case cover being a stamped sheet-metal member having integrally formed mounting portions spacing the gear case cover from the frame.

3. The gear reduction arrangement claimed in claim 2, wherein the gear case cover having a concave edge portion adjacent the driven gear, the gear case cover thereby being in non-overlying relation to the driven gear.

4. The gear reduction arrangement claimed in claim 1, wherein:
   (a) the frame cover having an access slot; and
   (b) the pinion shaft extending through the access slot outwardly of the frame cover for driving engagement with an external driver.

5. A gear reduction arrangement for a power driven tool, comprising:
   (a) a frame;
   (b) a gear case cover detachably mounted to the frame;
   (c) a driven gear of a first predetermined diameter rotatably connected to and positioned with respect to the frame;
   (d) pinion gear means positioned with respect to the frame and including a toothed pinion gear head, a mounting shaft coupled with said gear head, and a plurality of pinion gear, attachment heads, each attachment head having a toothed, central throughbore, dimensioned and configured to receive said pinion gear matingly therewithin for mounting said pinion gear attachment head on said pinion gear, and each attachment head having a different diameter;
   (e) means associated with each of the pinion gear attachment heads for retaining the attachment head in position on the pinion gear head, including an internal flange means formed in the gear heads adapted to extend over the pinion gear head proximate the gear case cover, the flange means defining a through bore adjacent to and coaxial with the toothed through-bore and having a diameter smaller than the diameter of the toothed throughbore;

(f) an idler gear positioned with respect to the frame and of a second predetermined diameter, and having an idler gear mounting shaft;

(g) means for rotatably supporting the idler gear and the pinion gear means between the frame main body portion and the gear case cover so that the idler gear is placed in meshing interengagement with the driven gear and the pinion means, without requiring changing the predetermined diameters of either the driven gear or the idler gear and without requiring changing the position of either the driven gear or the pinion gear means with respect to the frame, over a range of diameters of said plurality of pinion gear attachment heads; and (h) the means for supporting the idler gear and the pinion gear means including aligned pinion gear mounting apertures in the gear case cover and the frame for receiving the pinion gear shaft, and further including a plurality of discrete aligned idler gear mounting apertures in the gear case cover and the frame for receiving the idler gear mounting shaft, each one of the plurality of aligned idler gear mounting apertures corresponding to said one of the plurality of the pinion gear attachment heads.

* * * * *